(12) United States Patent
Moradnia et al.

(10) Patent No.: US 11,618,511 B2
(45) Date of Patent: Apr. 4, 2023

(54) SURFACE PATTERN FOR A VEHICLE

(71) Applicant: Honda Motor Co., Ltd., Tokyo (JP)

(72) Inventors: Pirooz Moradnia, Dublin, OH (US); Pratap Thamanna Rao, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 193 days.

(21) Appl. No.: 17/147,153

(22) Filed: Jan. 12, 2021

(65) Prior Publication Data

US 2022/0219766 A1 Jul. 14, 2022

(51) Int. Cl.
B62D 35/00 (2006.01)

(52) U.S. Cl.
CPC ................... B62D 35/00 (2013.01)

(58) Field of Classification Search
CPC ....... B62D 35/00; B62D 35/02; B62D 35/007
See application file for complete search history.

(56) References Cited

U.S. PATENT DOCUMENTS

| | | | |
|---|---|---|---|
| 4,040,760 A | 8/1977 | Wyckoff | |
| 4,932,612 A * | 6/1990 | Blackwelder | B64C 21/04 244/209 |
| 4,986,496 A | 1/1991 | Marentic et al. | |
| 5,114,099 A * | 5/1992 | Gao | B64C 21/10 244/130 |
| 5,133,516 A | 7/1992 | Marentic et al. | |
| 5,133,519 A * | 7/1992 | Falco | B64C 21/04 244/130 |
| 5,386,955 A | 2/1995 | Savill | |
| 5,501,545 A * | 3/1996 | Walter | E01F 9/553 359/531 |
| 6,296,295 B1 * | 10/2001 | Jambor | B60J 1/183 296/146.14 |
| 7,070,850 B2 | 7/2006 | Dietz et al. | |
| 7,475,853 B2 * | 1/2009 | Segota | B64C 23/005 114/291 |
| 8,413,928 B2 | 4/2013 | Rawlings et al. | |
| 8,668,166 B2 | 3/2014 | Rawlings et al. | |
| 8,684,310 B2 | 4/2014 | Rawlings et al. | |
| D704,112 S * | 5/2014 | Salaverry | B64C 21/02 D12/181 |
| 9,308,987 B1 * | 4/2016 | Riggins | B64C 21/02 |
| 9,714,576 B2 * | 7/2017 | Sander | F01D 5/286 |
| 9,751,618 B2 | 9/2017 | Rawlings et al. | |
| 9,926,453 B2 | 3/2018 | Campazzi et al. | |
| 9,932,481 B2 | 4/2018 | Song | |

(Continued)

FOREIGN PATENT DOCUMENTS

| | | |
|---|---|---|
| CA | 1292931 | 12/1991 |
| EP | 0246914 | 4/1990 |

(Continued)

*Primary Examiner* — Lori L Lyjak (74) *Attorney, Agent, or Firm* — Rankin, Hill & Clark LLP (57) ABSTRACT

A surface pattern for a vehicle includes an upper body component having a forward end, a rearward end, and an upper surface that tapers as the upper body component extends along a portion of a length of the vehicle from the forward end to the rearward end of the component. The upper surface includes a plurality of rearward facing steps extending along the tapered portion of the upper surface toward the rearward end of the component.

20 Claims, 8 Drawing Sheets

(56) References Cited

U.S. PATENT DOCUMENTS

| | | |
|---|---|---|
| 2005/0003146 A1 | 1/2005 | Spath |
| 2008/0088052 A1 | 4/2008 | Takada et al. |
| 2009/0071598 A1 | 3/2009 | Takada et al. |
| 2011/0274875 A1 | 11/2011 | Lang |
| 2014/0272237 A1 | 9/2014 | Roper et al. |
| 2014/0349082 A1 | 11/2014 | Tien |
| 2014/0356219 A1 | 12/2014 | Gammel et al. |
| 2015/0343959 A1* | 12/2015 | Espig .................. A45C 5/14 296/180.1 |
| 2016/0237651 A1* | 8/2016 | Miyamoto .......... B60W 30/182 |
| 2017/0266932 A1 | 9/2017 | Campazzi et al. |
| 2018/0037097 A1* | 2/2018 | Haynes ................ B60J 7/1226 |
| 2019/0225282 A1* | 7/2019 | Pereira ................ B62D 35/005 |

FOREIGN PATENT DOCUMENTS

| | | | |
|---|---|---|---|
| EP | 0246915 | 8/1991 | |
| EP | 1283163 A2 * | 2/2003 | ............. B64C 21/10 |
| JP | 2012026433 | 2/2012 | |
| JP | 2012061820 | 3/2012 | |

\* cited by examiner

SURFACE PATTERN FOR A VEHICLE

BACKGROUND

An object of diffuser design in vehicle performance is to provide a diffuser for a vehicle that contributes to an improved overall coefficient of drag of the vehicle. As such, known diffusers feature smooth exterior surfaces along a longitudinal direction of a vehicle so as to provide a smooth pressure transition in a headwind of the vehicle as the headwind travels from a back end of the vehicle to behind the vehicle. Notably, the coefficient of drag of the vehicle is reduced due to the smooth design of the diffuser. However, a continued objective of diffuser design is to provide further improved aerodynamic characteristics of a vehicle in a headwind.

BRIEF DESCRIPTION

According to one aspect, a surface pattern for a vehicle includes an upper body component having a forward end, a rearward end, and an upper surface that tapers as it extends along a portion of a length of the vehicle from the forward end to the rearward end of the component, where the upper surface includes a plurality of rearward facing steps extending along the tapered portion of the upper surface toward the rearward end of the component.

According to another aspect, a surface pattern for a vehicle includes a plurality of rearward facing steps formed from a tier of treads and a plurality of risers, the plurality of steps being arranged in a front-back direction of the vehicle to form an exterior surface of the vehicle, where each riser in the plurality of risers is interposed between and separates a tread positioned rearward of the riser and a tread positioned forward of the riser in the front-back direction of the vehicle.

DETAILED DESCRIPTION

Figure 1:
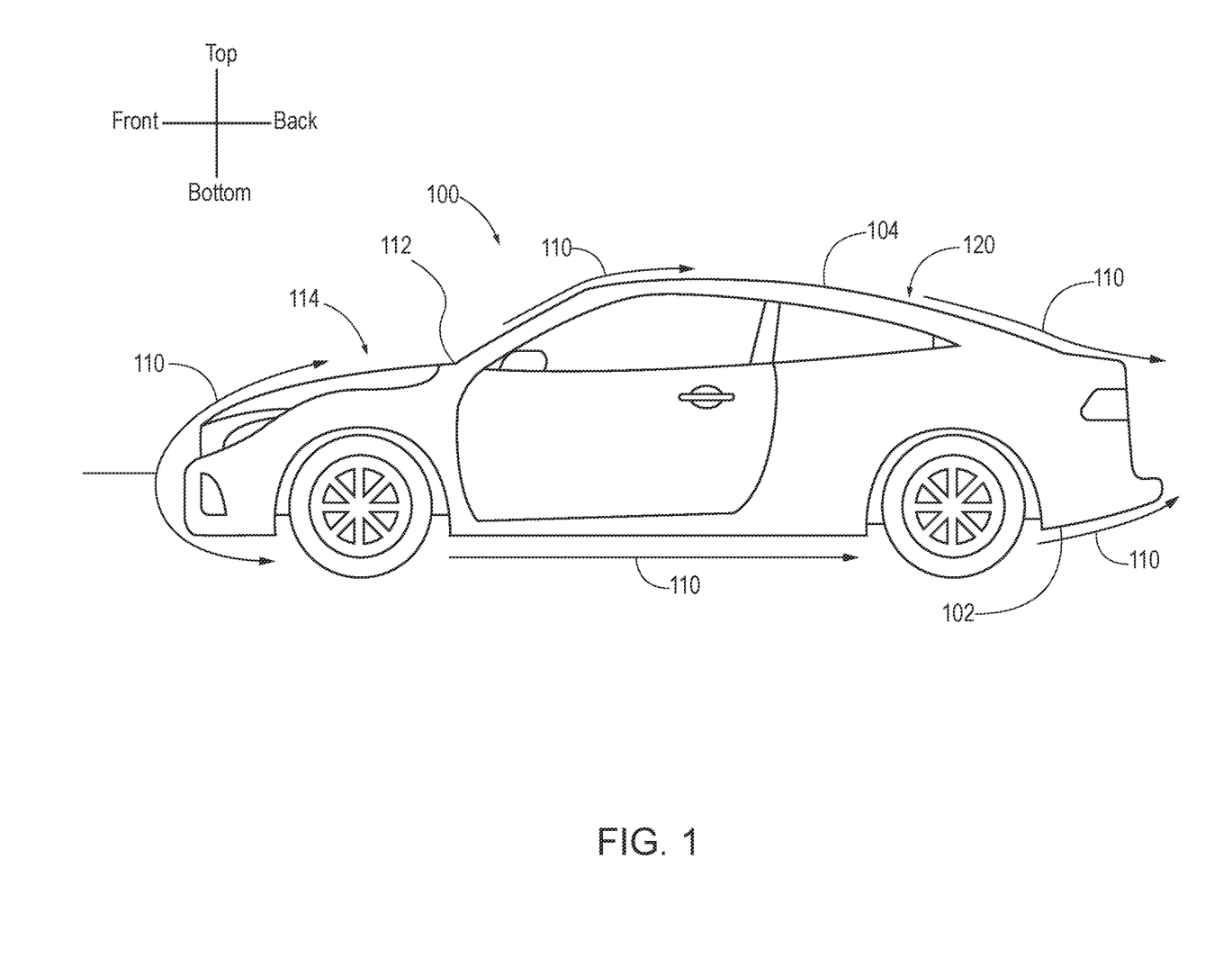
FIG. 1 is a side view of a vehicle.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 depicts a vehicle 100 including an underbody 102 and a roof 104. A headwind 110 around an exterior surface 112 of the vehicle 100 is directed under the underbody 102 and over the roof 104 in a front-back direction of the vehicle 100, from a front end 114 of the vehicle 100 to a back end 120 of the vehicle 100.

Figure 2:
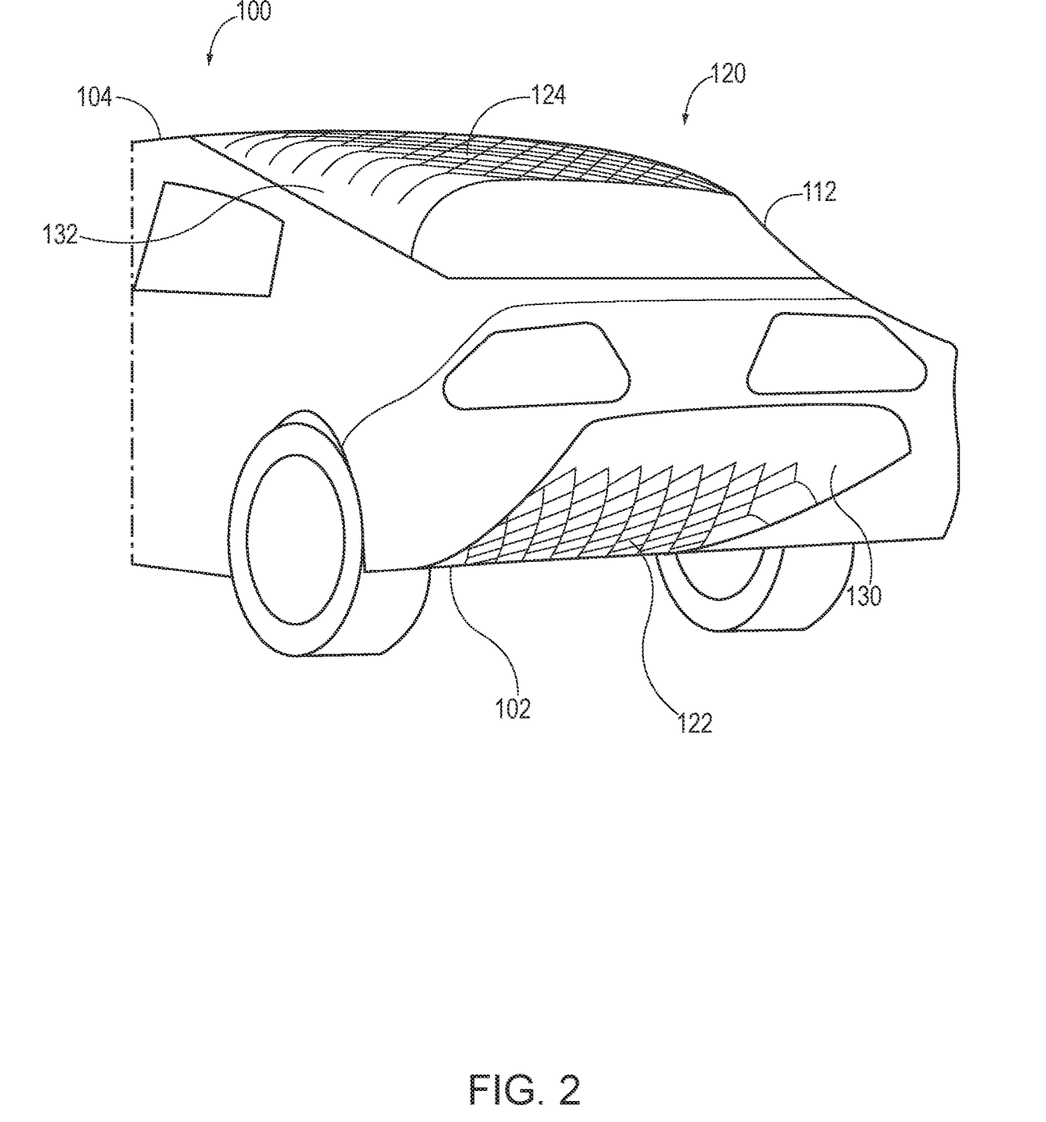
FIG. 2 is a partial perspective view of the vehicle including a back end of the vehicle.

As depicted in FIG. 2, a diffuser 122 at least partially defines the exterior surface 112 of the vehicle 100 along the back end 120 of the vehicle 100 at the underbody 102, and a surface pattern 124 at least partially defines the exterior surface 112 of the vehicle 100 along the back end 120 of the vehicle 100 at the roof 104. The diffuser 122 is located at the underbody 102, and is formed from a lower panel 130 that is rigidly mounted on the vehicle 100 and configured for resisting deformation in the headwind 110 so as to remain static with the vehicle 100. The lower panel 130 at least partially forms the underbody 102 of the vehicle 100 such that the headwind 110 flows under the lower panel 130. The surface pattern 124 is located at the roof 104, and similar to the diffuser 122 is formed from an upper panel 132 that is rigidly mounted on the vehicle 100, and configured for resisting deformation in the headwind 110 so as to remain static with respect to the vehicle 100. The upper panel 132 at least partially forms the roof 104 of the vehicle 100 such that the headwind 110 flows over the upper panel 132 at the roof 104.

The diffuser 122 features a construction similar to the surface pattern 124, having an orientation opposite from the surface pattern 124 with respect to a vertical direction of the vehicle 100. Unless otherwise stated the following description made with reference to the surface pattern 124 is similarly applicable to the diffuser 122.

Figure 3:
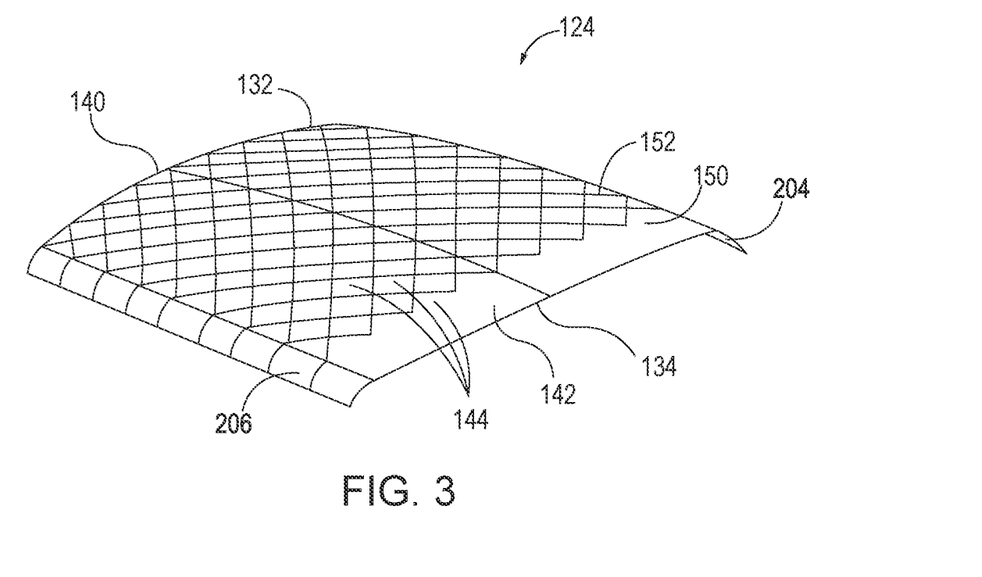
FIG. 3 is a partial perspective view of the vehicle including a surface pattern on a roof of the vehicle.

FIG. 3 depicts a partial perspective view of the vehicle 100 including the surface pattern 124, taken from in front of the upper panel 132 with respect to the front-back direction of the vehicle 100, and above the roof 104 with respect to a top-bottom direction of the vehicle 100. As shown in FIG. 3, the upper panel 132 is an upper body component at least partially forming the roof 104 of the vehicle 100, where the upper panel 132 includes a forward end 134 and a rearward end 140 with respect to the front-back direction of the vehicle 100. The upper panel 132 also includes an upper surface 142 that tapers as it extends along a portion of a length of the vehicle 100 in the front-back direction of the vehicle 100. The tapered portion of the upper surface 142 of the upper panel 132 descends inward with respect to the vehicle 100 as it extends along a portion of the length of the vehicle 100 from the forward end 134 to the rearward end 140 of the upper panel 132.

The surface pattern 124 includes a plurality of rearward facing steps 144 extended in a lateral direction of the vehicle 100 and arranged relative to each other in a longitudinal direction of the vehicle 100. The plurality of steps 144 is formed from tiers of treads 150 separated from each other by sets of risers 152 and respectively oriented along the lateral direction of the vehicle 100. The sets of risers 152 are interposed between and separate consecutive tiers of treads 150 along the longitudinal direction of the vehicle 100.

Figure 4:
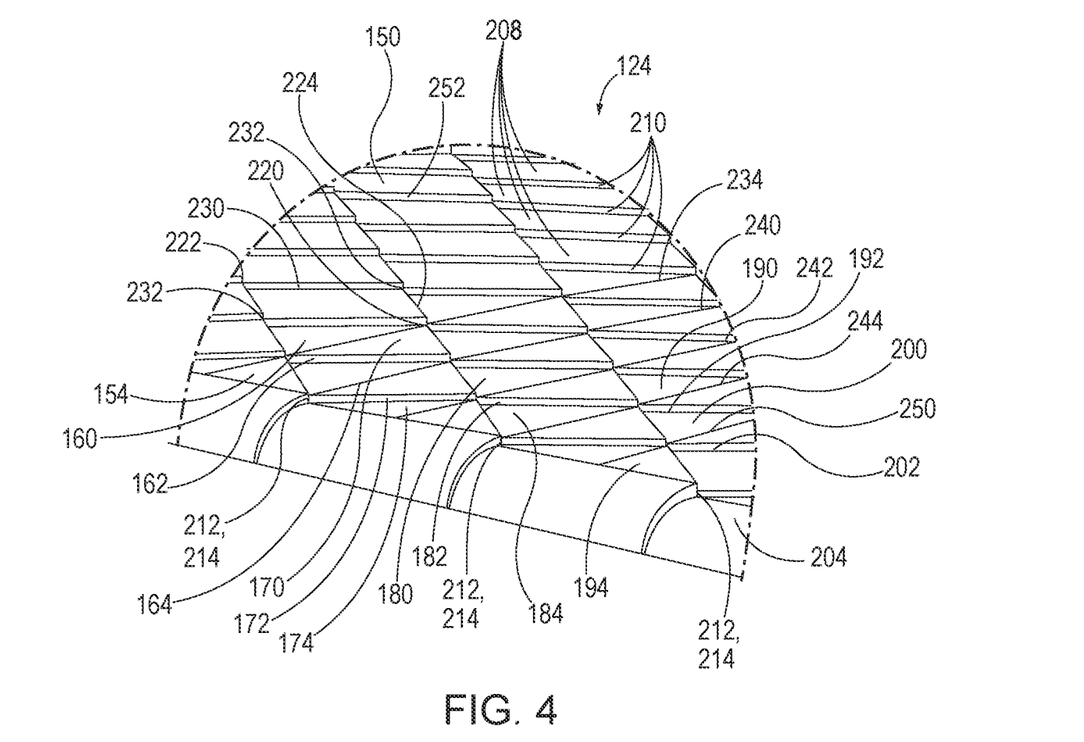
FIG. 4 is an enlarged partial perspective view of the surface pattern of FIG. 3.

FIG. 4 depicts an enlarged partial perspective view of the surface pattern 124, taken at a position along the surface pattern 124 in the lateral direction of the vehicle 100. As shown in FIG. 4, the tiers of treads 150 includes a first tier of treads 154 that forms a first step 160 in the plurality of steps 144 with a first set of risers 162 from the sets of risers 152, a second tier of treads 164 that forms a second step 170 in the plurality of steps 144 with a second set of risers 172 from the sets of risers 152, a third tier of treads 174 that forms a third step 180 in the plurality of steps 144 with a third set of risers 182 from the sets of risers 152, a fourth tier of treads 184 that forms a fourth step 190 in the plurality of steps 144 with a fourth set of risers 192 from the sets of risers 152, and a fifth tier of treads 194 that forms a fifth step 200 with a fifth set of risers 202 from the sets of risers 152. The upper panel 132 includes a first side wall 204 and a second side wall 206 spaced from each other across the upper panel 132 in the lateral direction of the vehicle 100. Each step 160, 170, 180, 190, 200 in the plurality of steps 144 extends in the lateral direction of the vehicle 100 across the upper panel 132 over the first side wall 204 and the second side wall 206 such that the tiered arrangement of steps 144 formed from the tiers of treads 150 and sets of risers 152 in the surface pattern 124 continues along the first side wall 204 and the second side wall 206 in the longitudinal direction of the vehicle 100.

The tiers of treads 150 are arranged along the front-back direction of the vehicle 100 so as to form leading tiers of treads 150 at least partially positioned forward of following tiers of treads 150 in pairs of consecutively arranged tiers of treads 150, where the second tier treads 164 are at least partially positioned rearward of the first tier treads 154, the third tier treads 174 are at least partially positioned rearward of the second tier treads 164, the fourth tier treads 184 are at least partially positioned rearward of the third tier treads 174, and the fifth tier treads 194 are at least partially positioned rearward of the fourth tier treads 184 with respect to the front-back direction of the vehicle 100. Each tier of treads 150 respectively includes one or more treads 208, and each set of risers 152 respectively includes one or more corresponding risers 210 extended downward from a leading tier of treads to a following tier of treads in pairs of consecutively arranged tiers of treads 150. The first step 160, the second step 170, the third step 180, the fourth step 190, and the fifth step 200 are exemplary steps in the plurality of steps 144 that are consecutively arranged in the surface pattern 124 along the front-back direction of the vehicle 100, and the plurality of steps 144 may include more or fewer steps without departing from the scope of the present disclosure.

Each step 160, 170, 180, 190, 200 in the plurality of steps 144 forms a zigzag pattern in the respective tiers of treads 154, 164, 174, 184, 194 along the respective sets of risers 162, 172, 182, 192, 202, where the zigzag pattern extends in the lateral direction of the vehicle 100 to have a saw tooth shape with teeth pointed toward the back end 120 of the vehicle 100. The zigzag pattern in each step 160, 170, 180, 190, 200 respectively defines a back set of vertices 212 and a front set of vertices 214 in each step 160, 170, 180, 190, 200 in the plurality of steps 144. The back set of vertices 212 locates back corners 220 of steps 160, 170, 180, 190, 200 formed in the tiers of treads 154, 164, 174, 184, 194 and is positioned closer to the back end 120 of the vehicle 100 than the corresponding front set of vertices 214 of a same tier of treads 154, 164, 174, 184, 194. The front set of vertices 214 locates front corners 222 of steps 160, 170, 180, 190, 200 formed in the tiers of treads 154, 164, 174, 184, 194 and is positioned closer to the front end 114 of the vehicle 100 than the corresponding back set of vertices 212 of a same tier of treads 154, 164, 174, 184, 194.

With continued reference to FIG. 4, the tiers of treads 150 arranged consecutively with each other along the longitudinal direction of the vehicle 100 are staggered from each other in the lateral direction of the vehicle 100 such that the back sets of vertices 212 and the front sets of vertices 214 overlap in pairs of leading tiers of treads 150 and following tiers of treads 150 with respect to the front-back direction of the vehicle 100. With this construction, each tread 208 in the tiers of treads 150 forms a quadrilateral shape having corners and edges set by corresponding back sets of vertices 212 and front sets of vertices 214, where the back corner 220 defines a trailing edge 224, the front corner 222 defines a leading edge 230, and two side corners 232 are positioned along the length of the vehicle 100 between the leading edge 230 and the trailing edge 224.

In this manner, the first tier treads 154, the second tier treads 164, the third tier treads 174, the fourth tier treads 184, and the fifth tier treads 194 each include a series of quadrilateral shapes, each quadrilateral shape including the back corner 220 defining the trailing edge 224, the front corner 222 defining the leading edge 230, and the two side corners 232 positioned along the length of the vehicle 100 between the leading edge 230 and the trailing edge 224. With respect to the front-back direction of the vehicle 100, the leading edge 230 of the second tier treads 164 is positioned along the length of the vehicle 100 forward of the trailing edge 224 of the first tier treads 154, the leading edge 230 of the third tier treads 174 is positioned along the length of the vehicle 100 forward of the trailing edge 224 of the second tier treads 164, the leading edge 230 of the fourth tier treads 184 is positioned along the length of the vehicle 100 forward of the trailing edge 224 of the third tier treads 174, and the leading edge 230 of the fifth tier treads 194 is positioned along the length of the vehicle 100 forward of the trailing edge 224 of the fourth tier treads 184.

The two side corners 232 of each first tier tread 154 are positioned along a first line 234 in the lateral direction of the vehicle 100. The two side corners 232 of each second tier tread 164 are positioned along a second line 240 in the lateral direction of the vehicle 100, where the second line 240 is positioned rearward of the first line 234. The two side corners 232 of each third tier tread 174 are positioned along a third line 242 in the lateral direction of the vehicle 100, where the third line 242 is positioned rearward of the second line 240. The two side corners 232 of each fourth tier tread 184 are positioned along a fourth line 244 in the lateral direction of the vehicle 100, where the fourth line 244 is positioned rearward of the third line 242. The two side corners 232 of each fifth tier tread 194 are positioned along a fifth line 250 in the lateral direction of the vehicle 100, where the fifth line 250 is positioned rearward of the fourth line 244.

As such, the trailing edge 224 of each first tier tread 154 is positioned along the first line 234, and the leading edge 230 of each second tier tread 164 is positioned along the first line 234. The trailing edge 224 of each second tier tread 164 is positioned along the second line 240, and the leading edge 230 of each third tier tread 174 is positioned along the second line 240. The trailing edge 224 of each third tier tread 174 is positioned along the third line 242, and the leading edge 230 of each fourth tier tread 184 is positioned along the fourth line 244. The trailing edge 224 of each fourth tier tread 184 is positioned along the fourth line 244, and the leading edge 230 of each fifth tier tread 194 is positioned along the fourth line 244. Also, the trailing edge 224 of each fifth tier tread 194 is positioned along the fifth line 250.

With continued reference to FIG. 4, the sets of risers 152 are interposed between and separate the tiers of treads 150 along the roof 104 in the longitudinal direction of the vehicle 100 such that the tiers of treads 150 and the sets of risers 152 are alternately arranged along the roof 104 in the longitudinal direction of the vehicle 100. The plurality of steps 144 at least partially form the exterior surface 112 of the vehicle 100. To this end, the plurality of steps 144 are formed from the upper panel 132, and are continuous with each other along the exterior surface 112 of the vehicle 100, with the tiers of treads 150 and sets of risers 152 being alternately arranged in the longitudinal direction of the vehicle 100. Each set of risers 152 is oriented substantially vertically on the vehicle 100, and in this manner, each step 160, 170, 180, 190, 200 is configured for separating the headwind 110 from the exterior surface 112 of the vehicle 100 as the headwind 110 passes over a corresponding set of risers 162, 172, 182, 192, 202.

Each riser 210 in the plurality of steps 144 is substantially vertically oriented to extend downward from a leading tier of treads 150 to a following tier of treads 150 in a pair of consecutively arranged tiers of treads 150, such that the exterior surface 112 of the vehicle 100 at each riser 210 is oriented toward the back end 120 of the vehicle 100. With this construction, a backward face 252 of each riser 210 is configured for separating the headwind 110 from the exterior surface 112 of the vehicle 100 as the headwind 110 passes over the plurality of steps 144 from a trailing edge 224 of a leading tread 208 to a leading edge 230 of a following tread 208 in a pair of consecutively arranged treads 208.

Each tread 208 forms a circulation surface behind the trailing edge 224, where the circulation surface is configured for maintaining a circulating airflow 254 between the exterior surface 112 of the vehicle 100 and the headwind 110. With a circulating airflow between the exterior surface 112 of the vehicle 100 and the headwind 110, the headwind 110 is separated from the exterior surface 112 of the vehicle 100 over each tread 208 at the leading edge 230. In this manner, the backward face 252 of each riser 210 and a corresponding tread 208 following the riser 210 in the front-back direction of the vehicle 100 support the circulating airflow behind the respective riser 210 and along the tread 208 in the front-back direction of the vehicle 100, between the trailing edge 224 and the headwind 110 in the vertical direction of the vehicle 100.

Each tread 208 includes an attachment surface located behind the leading edge 230 in the front-back direction of the vehicle 100, and along the trailing edge 224, where the attachment surface is configured for facilitating and maintaining attachment with the headwind 110 to the exterior surface 112 of the vehicle 100. To this end, each trailing edge 224 of each tread 208 in the tiers of treads 150 substantially conforms to an aerodynamic shape configured to facilitate and maintain attachment of the headwind 110 to the exterior surface 112 of the vehicle 100. In this manner, as the headwind 110 flows over the plurality of steps 144 in the front-back direction of the vehicle 100, the headwind 110 repeatedly attaches to and separates from the exterior surface 112 of the vehicle 100 at the trailing edge 224 of each tread 208.

With continued reference to FIG. 4, the tiers of treads 150 and sets of risers 152 are formed continuous with each other in alternating order along the surface pattern 124 in the longitudinal direction of the vehicle 100. In this manner, between each two consecutively arranged steps 144, a trailing edge 224 of a leading tier of treads 150 is continuous with a set of risers 152 corresponding with a leading edge 230 of a following tier of treads 150, where the set of risers 152 extends downward from the leading tier of treads 150 to the following tier of treads 150. For example, the trailing edges 224 of the first tier treads 154 are continuous with the leading edges 230 of the second tier treads 164 through the first set of risers 162, the trailing edges 224 of the second tier treads 164 are continuous with the leading edges 230 of the third tier treads 174 through the second set of risers 172, the trailing edges 224 of the third tier treads 174 are continuous with the leading edges 230 of the fourth tier treads 184 through the fourth set of risers 192, and the trailing edges 224 of the fourth tier treads 184 are continuous with the leading edges 230 of the fifth tier treads 194 through the fifth set of risers 202.

Figure 5:
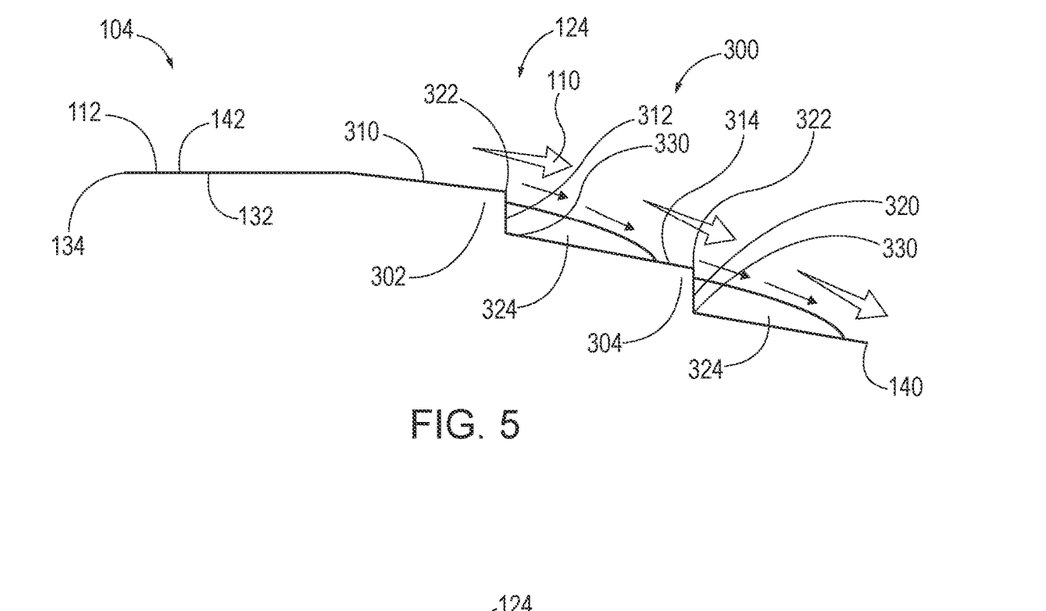
FIG. 5 is a partial cross-sectional view of an embodiment of the surface pattern.

In an alternative embodiment, tiers of treads define an incline in the exterior surface 112 of the vehicle 100. To this end, FIG. 5 depicts a partial cross-sectional view of the surface pattern 124 including a plurality of steps 300 including a first step 302 and a second step 304, the first step 302 being formed from a first tier of treads 310 and first set of risers 312, the second step 304 being formed from a second tier of treads 314 and a second set of risers 320. The first step 302 and the second step 304 are an exemplary pair of steps 300 consecutively arranged in the longitudinal direction of the vehicle 100. Each of the first tier treads 310 and the second tier treads 314 defines a downward incline into the exterior surface 112 of the vehicle 100 along the roof 104 in the front-back direction of the vehicle 100. In this manner, the upper surface 142 of the upper panel 132 forming the surface pattern 124 tapers downward as it extends along a portion of the length of the vehicle 100 from the forward end 134 to the rearward end 140 of the upper panel 132. Unless otherwise stated, the plurality of steps 300 has similar features and functions in a similar manner as the as the plurality of steps 144.

The plurality of steps 300 define a 5-25 degree incline downward, in the vertical direction of the vehicle 100, and inward with respect to the exterior surface 112 of the vehicle 100 along the front-back direction of the vehicle 100. In an embodiment, the plurality of steps 300 respectively define a 5-13 degree incline downward, inward with respect to the exterior surface 112 of the vehicle 100, along the front-back direction of the vehicle 100. In an alternative embodiment, the plurality of steps 300 define a 7-11 degree incline downward, inward with respect to the exterior surface 112 of the vehicle 100, along the front-back direction of the vehicle 100. To this end, the plurality of steps 300 are oriented to support a circulating airflow 324 between the exterior surface 112 of the vehicle 100 and the headwind 110 and maintain a separation of the headwind 110 from the plurality of steps 300 along leading edges 330 of the steps 300. The plurality of steps 300 are also oriented such that corresponding trailing edges 322 facilitate and maintain attachment of the headwind 110 to the exterior surface 112 of the vehicle 100. As shown, the plurality of steps 300 respectively define consistent inclines relative to each other with respect to the exterior surface 112 of the vehicle 100 and the headwind 110, along the front-back direction of the vehicle 100.

Figure 6:
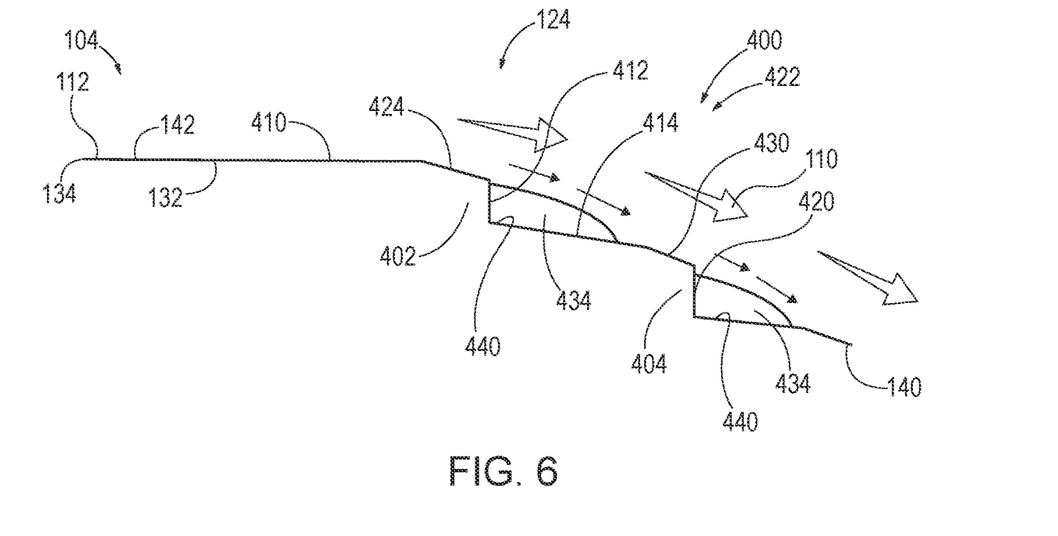
FIG. 6 is a partial cross-sectional view of an embodiment of the surface pattern.

In an alternative embodiment, treads formed on the surface pattern 124 include chamfers angled to substantially conform to an angle of the headwind 110 over the surface pattern 124, and are respectively configured to balance a static pressure from the headwind 110 on the treads and the risers. To this end, FIG. 6 depicts a plurality of steps 400 including a first step 402 and a second step 404, the first step 402 being formed from a first tier of treads 410 and a first set of risers 412, the second step 404 being formed from a second tier of treads 414 and a second set of risers 420. The plurality of steps 400 includes a plurality of chamfers 422, with a first chamfer 424 formed in the first step 402 and a second chamfer 430 formed in the second step 404. The first chamfer 424 is formed in the first step 402 in the first tier of treads 154 at the first set of risers 412, and the second chamfer 430 is formed in the second step 404 in the second tier of treads 414 at the second set of risers 420. In this manner, each of the first step 402 and the second step 404 respectively includes a chamfer 424, 430 formed at a corner of the step 402, 404 between the corresponding tier of treads 410, 414 and the corresponding set of risers 412, 420 along the front-back direction of the vehicle 100, along the set of risers 412, 420 and a trailing edge 432 of the tier of treads 410, 414. Each of the first chamfer 424 and the second chamfer 430 is respectively formed where the corresponding trailing edge 432 is configured to attach the headwind 110 to the exterior surface 112 of the vehicle 100 in the front-back direction of the vehicle 100.

The plurality of steps 400 are oriented to support a circulating airflow 434 between the exterior surface 112 of the vehicle 100 and the headwind 110 and maintain a separation of the headwind 110 from the plurality of steps 400 along leading edges 440 of the steps 400. The plurality of steps 400 are also oriented such that the trailing plurality of chamfer 422 facilitate and maintain attachment of the headwind 110 to the exterior surface 112 of the vehicle 100. While the depicted plurality of chamfers 422 includes a first chamfer 424 and a second chamfer 430, the plurality of chamfers 422 may include fewer or additional chamfers without departing from the scope of the present disclosure. Unless otherwise stated, the plurality of steps 400 includes similar features and functions in a similar manner as the plurality of steps 144.

Figure 7:
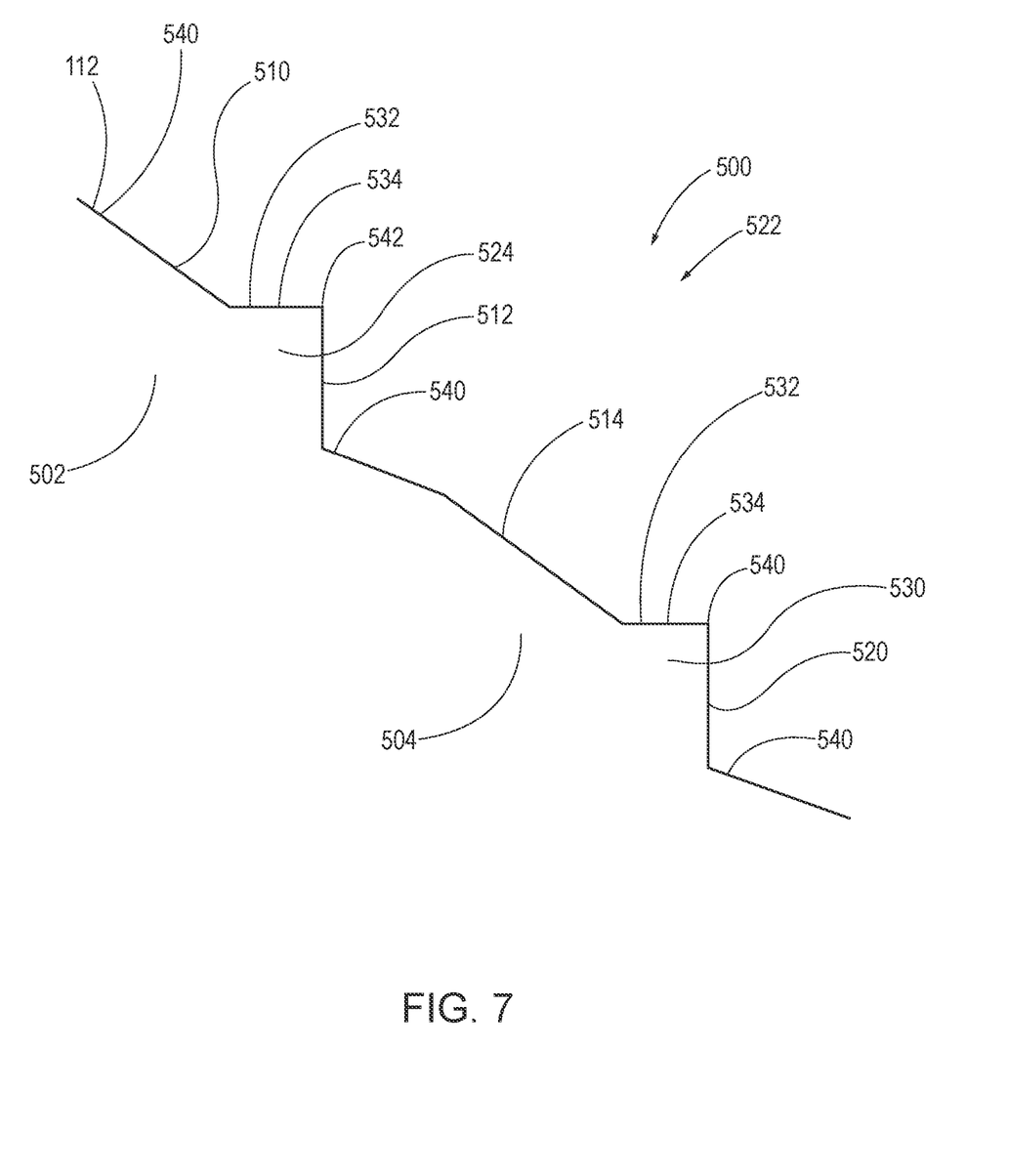
FIG. 7 is a partial cross-sectional view of an embodiment of the surface pattern.

In an alternative embodiment, treads formed on the surface pattern 124 include kicks angled to disrupt flow of the headwind 110 over the surface pattern 124 at the trailing edges of the treads. To this end, FIG. 7 depicts a plurality of steps 500 including a first step 502 and a second step 504, the first step 502 being formed from a first tier of treads 510 and a first set of risers 512, the second step 504 being formed from a second tier of treads 514 and a second set of risers 520. The plurality of steps 500 includes a plurality of kicks 522 including a first kick 524 and a second kick 530 on the exterior surface 112 of the vehicle 100, respectively formed in the first step 502 with the first tier of treads 510 at the first set of risers 512, and in the second step 504 with the second tier treads 514 at the second set of risers 520. In this manner, each step 502, 504 in the plurality of steps 500 respectively includes the kick 524, 530 at a trailing edge 532 of the corresponding tier of treads 510, 514, along the corresponding set of risers 512, 520.

The plurality of kicks 522 respectively includes a raised surface 534 formed from the corresponding tier of treads 510, 514, the kick 524, 530 respectively having a slope along the front-back direction of the vehicle 100 that is directed upward as compared to a slope of the tier of treads 510, 514 at a leading edge 540 in the front-back direction of the vehicle 100. A rearward portion 542 of the raised surface 534 is connected to the corresponding set of risers 512, 520 which forms the step 502, 504 with the tier of treads 510, 514, and is continuous with the set of risers 512, 520. While the depicted plurality of kicks 522 includes a first kick 524 and a second kick 530, the plurality of kicks 522 may include fewer or additional kicks without departing from the scope of the present disclosure. Unless otherwise stated, the plurality of steps 500 includes similar features and functions in a similar manner as the plurality of steps 144.

Figure 8:
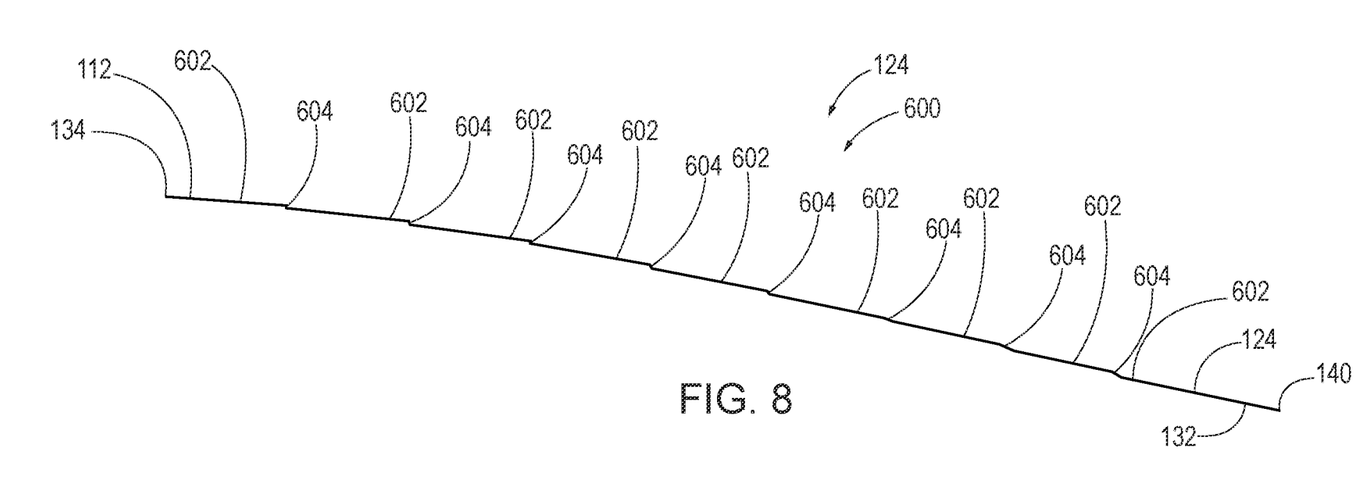
FIG. 8 is a partial cross-sectional view of an embodiment of the surface pattern.

In an alternative embodiment, the surface pattern 124 includes tiers of treads which are respectively curved, and sets of risers which have consistent heights and are consistently spaced from each other in the longitudinal direction of the vehicle 100. To this end, FIG. 8 depicts the surface pattern 124 including a plurality of steps 600 formed from tiers of treads 602 which are respectively curved along the longitudinal direction of the vehicle 100. The tiers of treads 602 respectively define inclines of increasing magnitude downward, inward with respect to the exterior surface 112 of the vehicle 100 along the front-back direction of the vehicle 100.

The tiers of treads 602 have a consistent length in the longitudinal direction of the vehicle 100 such that sets of risers 604 consecutively arranged along the longitudinal direction of the vehicle 100 are consistently spaced from each other in the longitudinal direction of the vehicle 100. The sets of risers 604 have consistent heights in the vertical direction of the vehicle 100, such that the plurality of steps 600 have heights in the vertical direction of the vehicle 100. Unless otherwise stated, the plurality of steps 600 includes similar features and functions in a similar manner as the plurality of steps 144.

Figure 9:
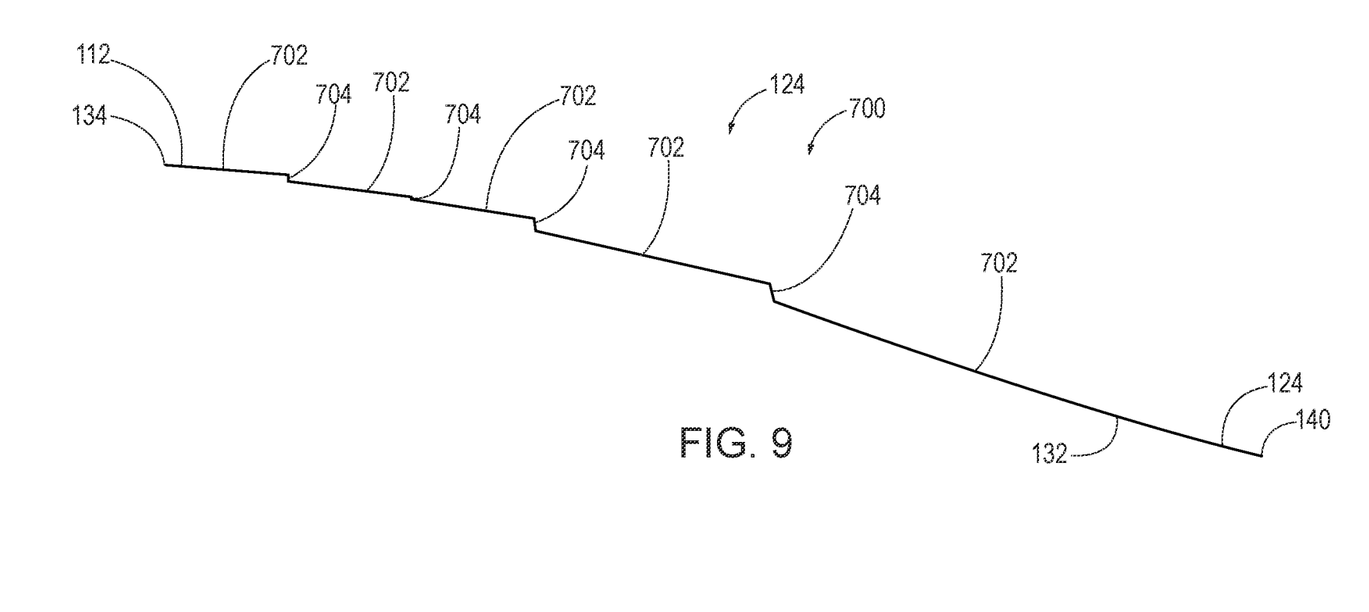
FIG. 9 is a partial cross-sectional view of an embodiment of the surface pattern.

In an alternative embodiment, tiers of treads are respectively curved, and sets of risers have increasing heights and are increasingly spaced from each other along the front-back direction of the vehicle 100. To this end, FIG. 9 depicts the surface pattern 124 including a plurality of steps 700 formed from tiers of treads 702 and sets of risers 704. The tiers of treads 702 respectively extend and are curved along the longitudinal direction of the vehicle 100 in increasing lengths along the front-back direction of the vehicle 100. The tiers of treads 702 respectively define inclines of increasing magnitude downward, inward with respect to the exterior surface 112 of the vehicle 100 along the front-back direction of the vehicle 100. In this manner, the upper surface 142 of the upper panel 132 descends inward with respect to the vehicle 100 as it extends along a portion of the length of the vehicle 100 from the forward end 134 to the rearward end 140 of the upper panel 132.

With the tiers of treads 702 having increasing lengths in the longitudinal direction of the vehicle 100, taken along the front-back direction of the vehicle 100, consecutively arranged steps in the plurality of steps 700 are increasingly spaced from each other along the front-back direction of the vehicle 100. Further, sets of risers 704 that are consecutively arranged with each other in the front-back direction of the vehicle 100 have heights of increasing magnitude in the vertical direction of the vehicle 100. Unless otherwise stated, the plurality of steps 700 includes similar features and functions in a similar manner as the plurality of steps 144.

Figure 10:
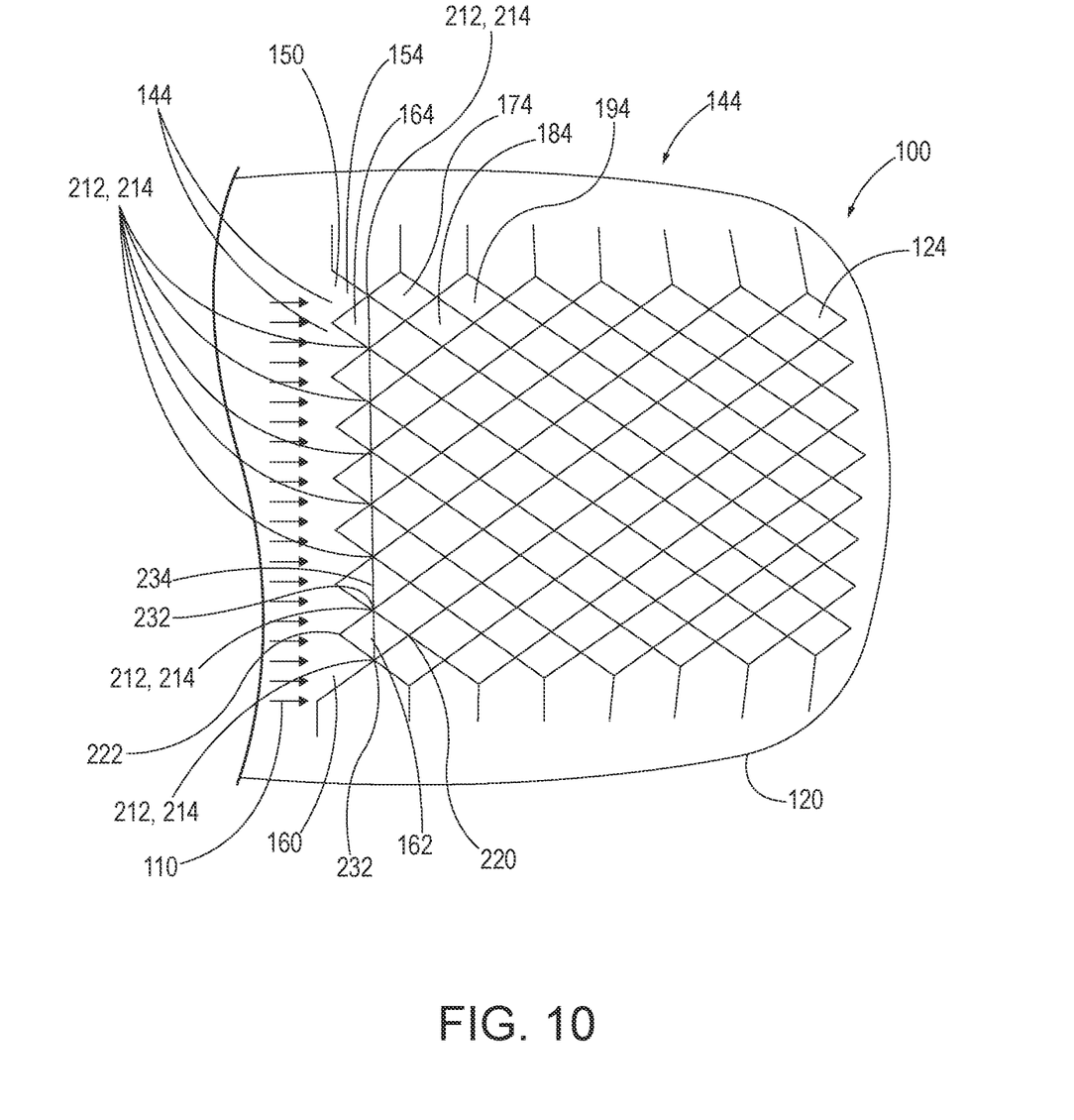
FIG. 10 is a top view of the back end of the vehicle including the surface pattern.

FIG. 10 depicts a top view of the back end 120 of the vehicle 100, including the surface pattern 124. As shown, consecutive tiers of treads 150 including the first tier treads 154, the second tier treads 164, the third tier treads 174, the fourth tier treads 184, the fifth tier treads 194 are arranged as staggered from each other in the lateral direction of the vehicle 100. More specifically, each two consecutive steps in the plurality of steps 144, for example the first step 160 and the second step 170, respectively form a leading step and a following step with respect to the front-back direction of the vehicle 100, where the first step 160 and the second step 170 are arranged such that the back set of vertices 212 of the first step 160 are positioned on the first line 234 with the front set of vertices 214 of the second step 170 to have a same longitudinal position of the vehicle 100 and a same lateral position of the vehicle 100. In this manner, each two consecutive steps in the plurality of steps 144 are interconnected through an overlapping back set of vertices 212 and front set of vertices 214 between leading steps and following steps such that each tread forms the quadrilateral shapes having the back corner 220, the front corner 222, and the two side corners 232 positioned along the first line 234 between the front corner 222 and the back corner 220.

Figure 11:
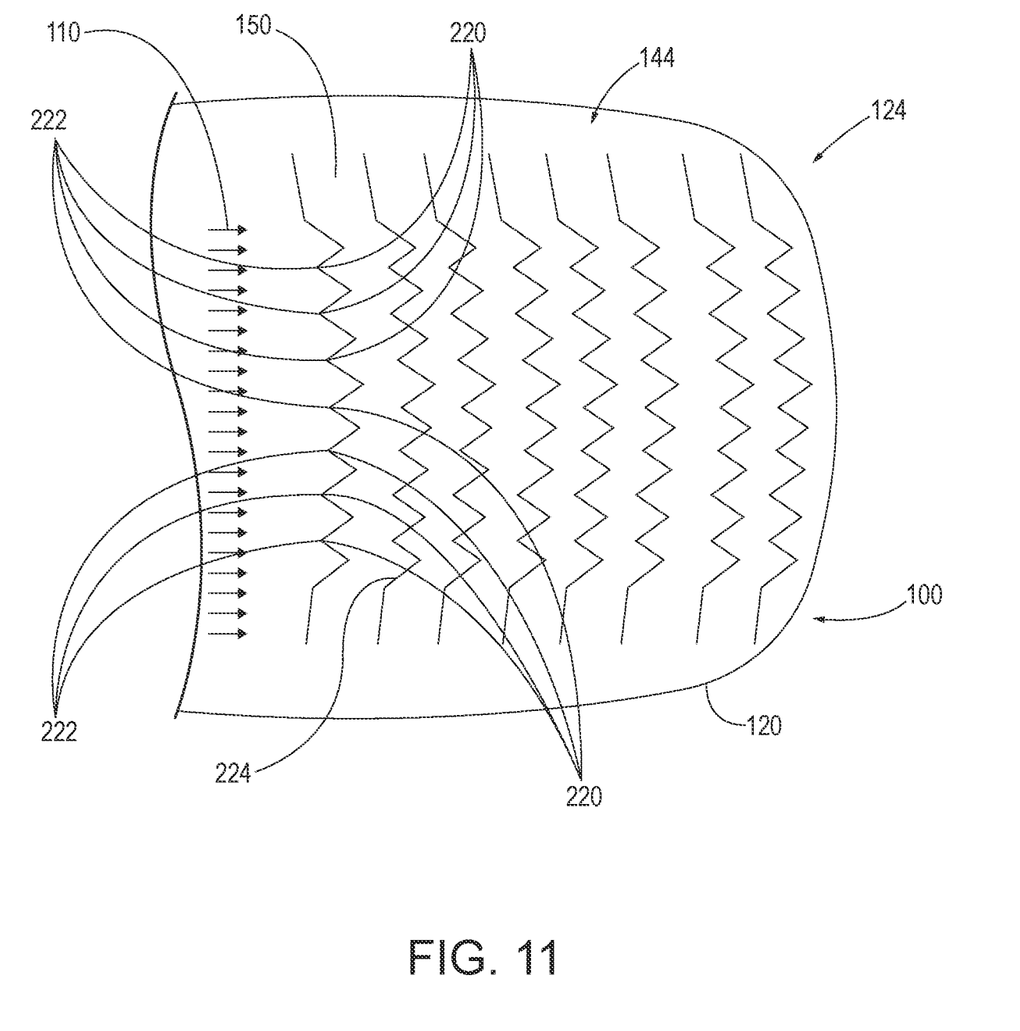
FIG. 11 is a top view of the back end of the vehicle including an embodiment of the surface pattern.

In an alternative embodiment, tiers of treads along the longitudinal direction of the vehicle 100 are arranged as aligned with each other in the lateral direction of the vehicle 100. To this end, FIG. 11 depicts the surface pattern 124 including the plurality of steps 144 where the tiers of treads 150 are arranged as aligned with each other in the lateral direction of the vehicle 100 such that the back corners 220 and the front corners 222 in the tiers of treads 150 are aligned across the plurality of steps 144 in the longitudinal direction of the vehicle 100. To this end, the back set of vertices 212 and the front set of vertices 214 of each tier of treads 150 is respectively aligned with the back set of vertices 212 and the front set of vertices 214 of the other tiers of treads 150 in the longitudinal direction of the vehicle 100.

Notably, as the headwind 110 flows over the surface pattern 124, the headwind 110 is inclined to flow across the surface pattern 124 in a direction normal to trailing edges 224 of the tiers of the treads 150. As such, the zigzag patterns defined along the sets of risers 152 in the plurality of steps 144, which are angled with respect to the lateral direction of the vehicle 100 and the longitudinal direction of the vehicle 100, cause the headwind 110 to flow into and mix with itself. When the tiers of treads 150 are arranged as staggered as depicted in FIGS. 3 and 9, an increased number of conflicting flows are created in the headwind 110 and cause the headwind 110 to flow into and mix with itself more actively than when the tiers of treads 150 are arranged as aligned in the lateral direction of the vehicle 100, as depicted in FIG. 11.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A surface pattern for a vehicle, comprising:
an upper body component comprising a forward end, a rearward end, and an upper surface that tapers as the upper body component extends along a portion of a length of the vehicle from the forward end to the rearward end of the component, wherein the upper surface comprises a plurality of rearward facing steps extending along the tapered portion of the upper surface toward the rearward end of the component,
wherein the plurality of steps comprises:
a first tier of one or more treads extending in a lateral direction of the vehicle;
a second tier of one or more treads extending in the lateral direction of the vehicle, wherein the second tier treads are at least partially positioned rearward of the first tier treads; and
one or more risers separating the first tier treads from the second tier treads,
where in a top view of the component the first tier treads comprise a series of simple quadrilateral shapes each including a front corner defining the trailing edge, a back corner defining a leading edge, and two side corners positioned along the length of the vehicle between the leading edge and the trailing edge of the first tier tread, and
where in the top view of the component the second tier treads comprise a series of simple quadrilateral shapes each including a back corner defining a trailing edge, a front corner defining the leading edge, and two side corners positioned along the length of the vehicle between the leading edge and the trailing edge of the second tier tread.

2. The surface pattern of claim 1, wherein
the first tier of one or more treads extend along a first line in the lateral direction of the vehicle; and
the second tier of one or more treads extend along a second line in the lateral direction of the vehicle.

3. The surface pattern of claim 2, wherein the first tier treads include a trailing edge, and the second tier treads include a leading edge positioned along the length of the vehicle forward of the trailing edge of the first tier treads.

4. The surface pattern of claim 3, wherein the two side corners of each first tier tread are positioned along the first line.

5. The surface pattern of claim 4, wherein the two side corners of each second tier tread are positioned along the second line, and wherein the second line is positioned rearward of the first line.

6. The surface pattern of claim 5, wherein the leading edge of each second tier tread is positioned along the first line.

7. The surface pattern of claim 6, wherein the trailing edge of each first tier tread is positioned along the second line.

8. The surface pattern of claim 1, wherein the tapered portion of the upper surface of the component descends inward with respect to the vehicle as the component extends along a portion of the length of the vehicle from the forward end to the rearward end of the component.

9. The surface pattern of claim 1, further comprising a chamfer formed in a step of the plurality of steps, at a corner of the step formed between a tread and a riser along a front-back direction of the vehicle.

10. The surface pattern of claim 1, further comprising a kick formed in a step of the plurality of steps, at a corner of the step formed between a tread and a riser along a front-back direction of the vehicle, wherein the kick includes a raised surface having a slope along the front-back direction of the vehicle that is directed upward as compared to a slope of the tread in the front-back direction of the vehicle.

11. A surface pattern for a vehicle, comprising:
an upper body component having a plurality of rearward facing steps formed from tiers of treads and set of risers, the plurality of steps being arranged in a front-back direction of the vehicle to form an exterior surface of the vehicle,
wherein the sets of risers are interposed between and separate the tiers of treads in the front-back direction of the vehicle,
wherein each step in the plurality of steps forms a zigzag pattern in the respective tiers of treads along the respective sets of risers, where in a top view of the component the zigzag pattern extends in a lateral direction of the vehicle such that in the front-back direction of the vehicle a back corner defining a trailing edge of each step is pointed toward a back end of the vehicle.

12. The surface pattern of claim 11, wherein the tiers of treads and the sets of risers are alternately arranged and formed continuously with each other in the front-back direction of the vehicle.

13. The surface pattern of claim 11, wherein the exterior surface of the vehicle defines a 5-25 degree incline downward over the plurality of steps along the front-back direction of the vehicle.

14. The surface pattern of claim 11, wherein the tiers of treads respectively define inclines with increasing magnitude downward along the front-back direction of the vehicle.

15. The surface pattern of claim 11, wherein the tiers of treads respectively define consistent inclines downward along the front-back direction of the vehicle.

16. The surface pattern of claim 11, further comprising a chamfer formed in a step of the plurality of steps, at a corner of the step formed between a tread from the tiers of treads and a riser from the sets of risers.

17. The surface pattern of claim 11, further comprising a kick formed at a trailing edge in a step of the plurality of steps, at a corner of the step formed between a tread from the tiers of treads and a riser from the sets of risers along the front-back direction of the vehicle, wherein the kick includes a raised surface having a slope along the front-back direction of the vehicle that is directed downward as compared to a slope of the tread at a leading edge in the front-back direction of the vehicle.

18. The surface pattern of claim 11, wherein a first tread located forward of a second tread with respect to the front-back direction of the vehicle is longer than the second tread in the front-back direction of the vehicle.

19. The surface pattern of claim 11, wherein consecutive steps in the plurality of steps are arranged as staggered from each other in the lateral direction of the vehicle to form quadrilateral shapes in the tiers of treads.

20. The surface pattern of claim 1, wherein component includes a first side wall and a second side wall spaced from each other across the component in the lateral direction of the vehicle, each step in the plurality of steps extends in the lateral direction of the vehicle across the component over the first side wall and the second side wall such that the tiered arrangement of steps formed from the first and second tiers of treads and the one or more risers in the surface pattern continues along the first side wall and the second side wall in a front-back direction of the vehicle.

* * * * *